United States Patent [19]

Abdul et al.

[11] Patent Number: 5,341,877
[45] Date of Patent: Aug. 30, 1994

[54] METHOD AND APPARATUS FOR IN SITU REMOVAL OF A SPILLED FLUID FROM THE EARTH'S SUBSURFACE

[75] Inventors: Abdul S. Abdul, Troy; Thomas L. Gibson, Utica; William A. Glasson, Warren, all of Mich.

[73] Assignee: General Motors Corporation, Detroit, Mich.

[21] Appl. No.: 941,291

[22] Filed: Sep. 4, 1992

Related U.S. Application Data

[63] Continuation-in-part of Ser. No. 758,137, Sep. 12, 1991, Pat. No. 5,180,013.

[51] Int. Cl.$^5$ .................. E21B 43/18; E21B 43/14; E21B 43/24
[52] U.S. Cl. .................. 166/272; 166/370; 166/53; 166/387; 166/67
[58] Field of Search ........... 166/370, 371, 266, 53, 166/54, 54.1, 369, 272, 387, 67

[56] References Cited

U.S. PATENT DOCUMENTS

| | | | |
|---|---|---|---|
| 4,368,781 | 1/1983 | Anderson | 166/50 |
| 4,625,807 | 12/1986 | Harlow | 166/370 |
| 4,660,639 | 4/1987 | Visser et al. | 166/267 |
| 4,730,672 | 3/1988 | Payne | 166/266 |
| 4,844,156 | 7/1989 | Hesh | 166/370 X |
| 4,886,119 | 12/1989 | Bernhardt et al. | 166/370 X |
| 4,934,458 | 6/1990 | Warburton et al. | 166/370 |
| 5,018,576 | 5/1991 | Udell et al. | 166/370 X |
| 5,050,676 | 9/1991 | Hess et al. | 166/370 X |
| 5,076,360 | 12/1991 | Morrow | 166/370 X |
| 5,095,975 | 3/1992 | Bernhardt | 166/370 X |
| 5,115,866 | 5/1992 | Corte et al. | 166/370 |
| 5,180,013 | 1/1993 | Abdul | 166/37 O |
| 5,220,958 | 6/1993 | Bernhardt | 166/370 X |

Primary Examiner—Stephen J. Novosad
Attorney, Agent, or Firm—George A. Grove

[57] ABSTRACT

In a preferred method, a spilled fluid, lighter than and immiscible with water, is removed from the subsurface by first penetrating through the fluid zone and at least partially through the groundwater zone to provide a bore in communication therewith. Then, at suitable intervals, an amount of fluid is extracted from the fluid zone through the bore at a selected rate. In addition, at suitable intervals, an amount of water from the groundwater zone is extracted through the bore at a selected rate. Meanwhile, a vacuum is applied to one or more selected portions of the subsurface to draw air therethrough, to volatilize volatilizable components of the fluid, and to induce movement of the volatile (vapor) and liquid and heavy components of the fluid into the bore for extraction. A recovery well has a perforated first tube in the bore and a second tube which moves axially within the first tube to expose a varying portion of the perforated axial extent of the second tube to the vacuum, whereby the vacuum is applied to a selected portion of the subsurface directing movement of air therethrough to volatilize light components and to induce movement of the vapor and liquid components to and through the tubes and to the top surface.

21 Claims, 3 Drawing Sheets

METHOD AND APPARATUS FOR IN SITU REMOVAL OF A SPILLED FLUID FROM THE EARTH'S SUBSURFACE

REFERENCE TO RELATED APPLICATION

This application is a continuation-in-part of copending application Ser. No. 758,137 filed Sep. 12, 1991, now U.S. Pat. No. 5,180,013.

FIELD OF THE INVENTION

This invention relates to a method and apparatus for in situ removal of a spilled, immiscible fluid from soil contaminated with the fluid, and in particular for the unique simultaneous use of hydraulic and pneumatic processes to maximize the extraction and recovery of volatile, semi-volatile and non-volatile components of a spilled fluid.

BACKGROUND OF THE INVENTION

Various methods for cleaning up sites contaminated with immiscible fluids, such as solvents, gasoline, diesel fuel and oils, include partial, in situ removal of the fluid from the earth's subsurface. Current methods include boring a well into the subsurface and either recovering a fraction of the spilled fluid by skimming, or pumping groundwater out from below the spilled fluid to cause some portion of the fluid to collect in previously uncontaminated regions and then pumping the fluid out. In another method, the fluid is intercepted in a trench or drain constructed at a level below the spilled fluid. These methods are typically ineffective, cause further spread of the contaminants through the subsurface of the soil, and result in a large portion of the fluid remaining trapped in soil and groundwater.

One method which uses vacuum extraction for removal of volatile contaminant from soil is described in U.S. Pat. No. 4,660,639. The method relies on the placement of alternating layers of high and low permeability filler in an annulus between a well bore and well pipe to cause movement of air through contaminated soil toward the well. This method does not provide means for adjustment of the air path and does not provide for removal of relatively less volatile components (i.e., semi-volatile and non-volatile components).

Another method uses vacuum extraction along with a series of air injection wells. This method, described in U.S. Pat. No. 4,730,672, does not provide means for adjustment of either the vacuum draw or the air injection in order to adjust the air path in the subsurface. This method does not provide for removal of relatively less volatile components.

The methods of both U.S. Pat. Nos. 4,660,639 and 4,730,672 are limited to removal of contaminants from a vadose zone, the upper, unsaturated layer of subsurface. Thus, these methods do not address clean-up of lower layers, such as a groundwater zone.

Therefore, what is needed is a method which removes volatile, semi-volatile and non-volatile components of spilled fluid from both the vadose and groundwater of the subsurface of earth, in situ, while preventing the spread of the spill and which selectively and adjustably applies vacuum draw to one or more contaminated layers of the subsurface.

SUMMARY OF THE INVENTION

There is provided a method and an apparatus for removing a spilled fluid from soil by vacuum selective and adjustable application of pneumatic and hydraulic forces applied to contaminated layers of soil (subsurface of earth). In addition, the method prevents migration of the fluid to previously uncontaminated areas. The terms "fluid" and "spilled fluid" as used herein refer to a fluid which is immiscible with, and lighter than, water. The fluid typically contains a relatively volatile component which is vaporizable at relatively low temperatures and/or pressure. Relatively less volatile components are semi-volatile (vaporized at a slow rate) and non-volatile (which remains in the liquid state).

The spilled fluid occupies a fluid zone which includes the vadose zone above the water table and a region beneath the water table through the zone of water table fluctuation. A layer referred to as free product could, and typically does, exist in the vicinity of the water table. This layer is characterized by an air/fluid interface at a top surface of the free product and a fluid/water interface at a lower surface. The underlying groundwater occupies a groundwater zone displaced vertically downward relative to the unstressed water table. The free product is typically able to flow under its own hydraulic head.

Basically, the method of the invention includes first penetrating through the fluid zone and at least partially through the groundwater zone to provide a bore hole or recovery well in communication therewith. Then, at suitable intervals, an amount of fluid is extracted from the fluid zone through the bore (well) at a rate selected to maintain contact between at least a portion of the fluid being extracted through the bore (well) and at least a portion of the fluid remaining in the fluid zone. In addition, at suitable intervals, an amount of water from the groundwater zone is separately extracted through the bore (well) to produce a head of fluid above the fluid/water interface adjacent the bore (well) sufficient to cause gravity drainage of the fluid from the fluid zone in a direction generally toward the bore (well). Meanwhile, a major portion of the fluid/water interface and any unstressed portions of the water table are maintained at levels closely adjacent the levels occupied prior to commencing any extraction of the fluid and the water to prevent further vertical spread of the fluid.

In another aspect, a vacuum is applied to one or more layers of the contaminated subsurface lateral of the bore hole (well). The vacuum draw volatilizes light components of the fluid and induces movement of the light and heavy components toward the bore for extraction from the subsurface. The draw is selectively applied to contaminated soil layers.

Desirably, the vacuum is sufficient to draw air through the subsurface in an amount sufficient to remove the vapor from the subsurface as it is formed so as to prevent recondensation. Preferably, heated air is injected into the subsurface through a second bore external of the first bore to further enhance volatilization and removal of vapor.

A recovery well is used to practice the method of the invention and basically consists of a perforated first (outside) tube or chamber disposed in the bore and a second (inside) tube encompassed by the first tube. Each tube has a sealed upper end exposed to the top surface and a distal lower end disposed in the bore. The second tube is axially aligned with the first tube. The second tube is constructed and arranged to move axially of the first tube to expose a varying portion of the perforated axial extent of the first tube to the vacuum. An opening in the upper end of the second tube is connected to vacuum means constructed and arranged to apply a vacuum through the opening. By this arrangement, as the second tube moves axially of the perforated first tube, the vacuum is applied to a selected portion of the subsurface directing movement of air through the subsurface to volatilize light components and to induce movement of light and heavy components to and through the tubes and to the surface.

Preferably, respective suction pumps are used to remove water and heavy (liquid) components of the fluid. Level adjust and control means sense movement of the fluid/water interface and adjust the location of the suction end of the water pump to below the interface, control the rate of fluid extraction to maintain a level of fluid in the well, and maintain the desired level of groundwater.

Thus, advantageously, the method provides the driving forces needed to volatilize light components of a spilled fluid and to induce flow of both light and heavy components of a spilled fluid toward the well bore for subsequent removal. As the spilled fluid is drained under enhancement by the applied vacuum, the drained pore spaces of the subsurface become exposed to the air flow, thus enhancing the vacuum process. This synergistic performance is accomplished without such driving forces causing undesired side affects such as spread of the contamination plume, adverse affect on area water systems and the like.

These and other objects, features and advantages will become apparent in the following description of the preferred embodiments, appended claims and accompanying drawings.

DETAILED DESCRIPTION OF THE PREFERRED EMBODIMENTS

Figure 1:
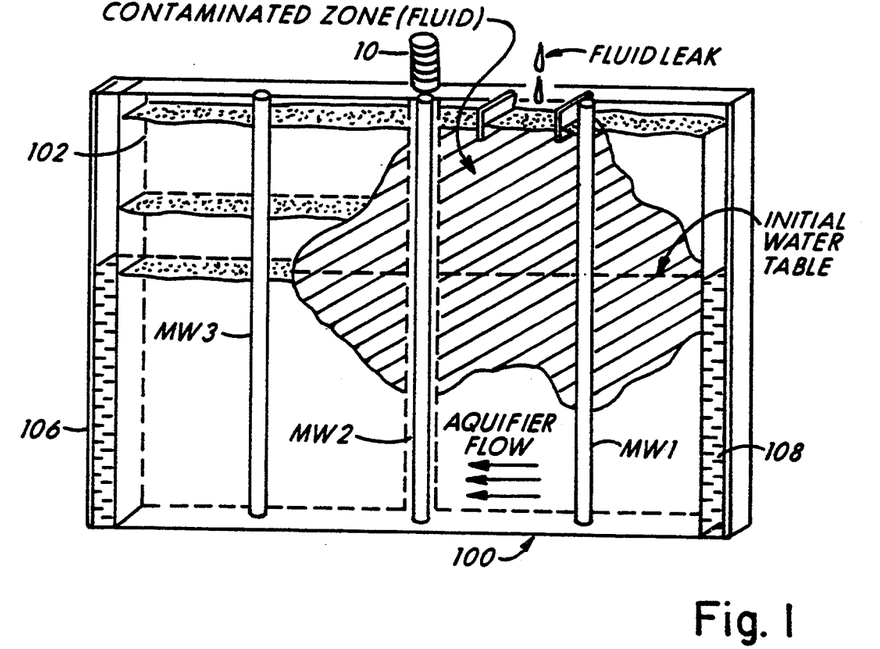
FIG. 1 is a laboratory model simulating typical earth subsurface soil and groundwater conditions.

FIG. 1 illustrates a laboratory model 100 constructed to simulate actual field conditions existing at a spill site. Soil samples from a field site were used to construct the laboratory model as shown in FIG. 1. The model simulates a vadose zone, which is a layer between the earth's surface and the earth's underground water table. The model consists of sand 102 and boundary reservoirs 106,108. The designation MW identifies monitoring wells.

In the model 100, a fluid leak is shown causing contamination in the subsurface of soil or earth, and is illustrated by cross-hatching in FIG. 1. This contaminated zone is referred to herein as a "fluid zone". The terms "fluid" and "spilled fluid" as used herein refer to a fluid which is immiscible in, and lighter than, water. The fluid contains a component which is relatively volatile so as to readily form a vapor at relatively moderate temperatures and/or pressure. A relatively less volatile component volatilizes more slowly (lower rate) and is referred to as semi-volatile. A relatively non-volatile component remains in a liquid state. The liquid portion of the spilled fluid is also referred to as "free product" or "free fluid". The liquid component typically has some portion of the volatile and/or semi-volatile components dissolved in it. The liquid component is typically heavier than the more volatile (light) component.

Figure 2:
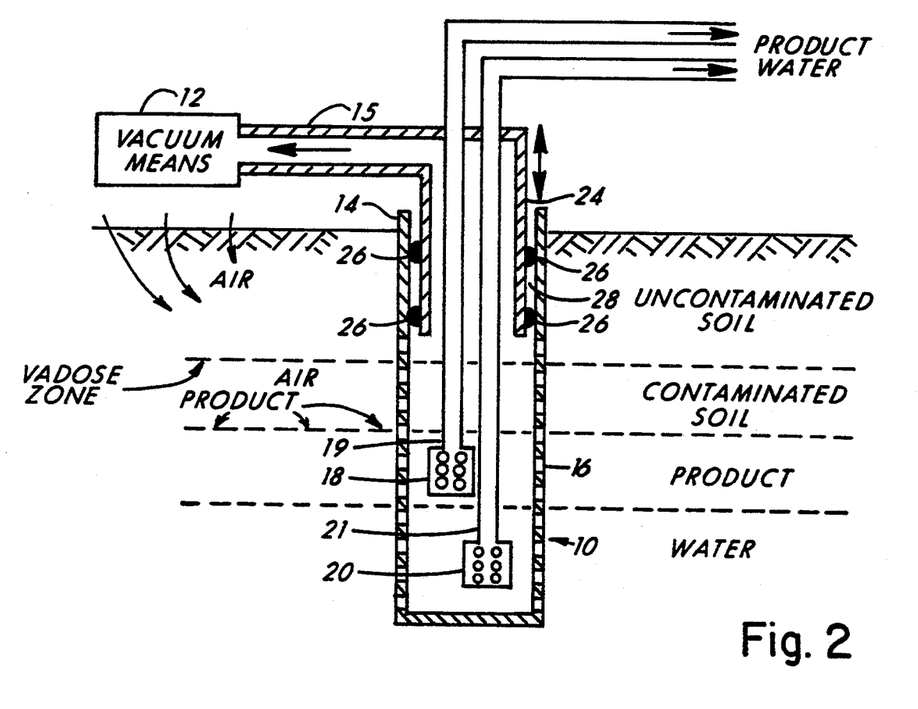
FIG. 2 is a schematic of an embodiment of a recovery well of the invention.

As shown in FIG. 2, a vacuum is induced in the recovery well 10 by means of a blower, regenerative blower, or vacuum pump 12 connected to the well head 14 by pipe 15. The recovery well 10 is installed in contaminated soil and is open through a perforated well tube or chamber 16 to an existing layer of free product, such as petroleum hydrocarbon or an organic solvent. The applied vacuum enhances the flow of the free product into the well. The free product is pumped by pump 18 from the well through the product recovery line 19. Groundwater containing dissolved fluid constituents is pumped by pump 20 from the tube 16 through a separate water recovery line 21.

The well 10, shown in FIG. 2, also functions as a vapor-extraction well. The vacuum applied to the well 10 to enhance liquid (free fluid) flow into the well simultaneously induces an air flow through an unsaturated soil zone above the free fluid layer. The unsaturated zone contains the organic contaminant in the form of liquid held in soil pores by capillary forces. The volatile components are removed from the unsaturated soil zone by volatilizing into the flowing airstream by vapor extraction. The vacuum is automatically controlled by pressure sensors and valves to create the optimum airflow rate in the soil, depending on the soil permeability and well dimensions.

The special recovery well 10, which simultaneously conducts vacuum-enhanced recovery of organic free product, groundwater recovery, and vapor extraction of contaminated soil, will also incorporate a means of adjusting the axial extent of perforated tube 16 through which the vacuum is applied. By this adjustment, the path of the airflow through the unsaturated, contaminated soil zone is controlled to maximize vapor extraction, product recovery and plume contaminant. An inside tube 24 is slidably received within perforated outside tube (chamber) 16 and is raised or lowered to control the length of the perforated tube 16 open to the contaminated soil zone. The inside tube 24 is fitted with one or more seals or O-rings 26 at its lower end to form a sealed annulus 28 between the inside and outside tubes to prevent air leaks. By raising and lowering the inside tube 24, airflow can be regulated to pass only through the contaminated soil zone, thus increasing the efficiency of vapor extraction, product recovery and plume contaminant. Attachments may be added to extend the length of the inside tube 24 as it is lowered within the perforated outside tube 16.

Groundwater pumping by pump 20 is necessary to prevent excessive rise in the water table at the recovery well 10 due to the applied vacuum in the well 10 and the removal of spilled fluid through pump 18.

Pump 18 in the perforated tube 16 extracts or removes the fluid from the fluid zone, while pump 20 extracts or removes groundwater adjacent the tube and from below the fluid zone layer to maintain the fluid/water interface and any unstressed portions of the water table at about the pre-extraction position, while enhancing the flow of the fluid into the outside tube.

Preferably, pump 18 exerts suction at a top surface of the fluid in the bore, and pump 20 exerts suction at a location below the top surface of the water and sufficiently spaced from the fluid/water interface to minimize mixing of fluid into the water.

The invention provides a method for extracting a spilled fluid from soil and groundwater, the fluid being immiscible with, and lighter than, water, occupying a fluid zone overlying groundwater and below the outer table. The layer of free product is characterized by air/fluid and fluid/water interfaces, with the underlying water occupying a groundwater zone displaced vertically downward relative to an unstressed water table. The invention comprises first penetrating through the fluid zone and at least partially through the groundwater zone to provide a bore in communication with the fluid zone and the groundwater zone. Then, at suitable intervals, an amount of fluid (liquid) is extracted from the fluid zone through the bore at a rate selected to maintain contact between at least a portion of the fluid (liquid) being extracted through the bore and at least a portion of the fluid (liquid) remaining in the fluid zone. In addition, at suitable intervals, an amount of water from the groundwater zone is separately extracted through the bore to produce a head of fluid above the fluid/water interface adjacent the bore sufficient to cause gravity drainage of the fluid from the fluid zone in a direction generally toward the bore. Meanwhile, a major portion of the fluid/water interface and any unstressed portions of the water table are maintained at levels closely adjacent or near the levels occupied prior to commencing any extraction of the fluid and the water, to prevent further vertical spread of the fluid.

Meanwhile, a vacuum is applied to one or more selected portions of the subsurface to draw air therethrough, to volatilize the light components of the fluid, and to induce movement of the light and heavy components of the fluid into the bore for extraction.

Desirably, the vacuum is sufficient to draw air through the subsurface in an amount sufficient to remove the vapor from the subsurface as it is formed so as to prevent recondensation. Preferably, heated air is injected into the subsurface through a second bore spaced from the first bore to further enhance volatilization and removal of vapor.

Remediation of the contaminated soil and groundwater according to this invention proceeds in at least two phases. In a first phase, the organic free fluid (liquid) layer is removed from portions of the soil essentially saturated with fluid by using a vacuum to enhance its flow into the well. It is then extracted by pumping it to a surface storage tank. During this process, residual fluid is also removed from unsaturated portions of the soil by vapor extraction, while the water table is maintained near its original level.

After the free fluid layer is effectively removed, a second phase begins in which groundwater is pumped from the same well at an increased rate to depress the level of the groundwater zone adjacent the bore to cause any fluid intermingled with the groundwater to be deposited on surfaces of the soil, and then applying a vacuum to the groundwater zone to cause movement of air therethrough and to volatilize the light component of the deposited fluid and to induce movement of the light and heavy components of the deposited fluid into the bore for extraction of the deposited fluid.

In this second phase, the lowering of the water table increases the thickness of the unsaturated zone and leaves residual contaminant in the de-watered zone. Airflow and vapor extraction induced by the vacuum in the de-watered zone removes the residual contaminant left there after fluid pumping. The steps of the phases desired above may be conducted simultaneously. Typically, this is done after a substantial portion of the free fluid has been removed.

The fluid and water pumping strategy was tested at a spill site, as described in Example 1 below. The vacuum-enhanced recovery strategy was tested at another spill site, as described in Example 2 below. The two strategies were demonstrated in combination at a third site as described in Example 3.

EXAMPLE 1

Five fluid recovery systems were installed at a 64,000 square foot field site where 200,000 gallons of fluid (oil of viscosity of about seven centistokes at 100° C.) had been spilled. The plume created by the spill occupied a volume defined by a depth of 11 feet and a maximum peripheral extent of about 250 feet. Each system included a recovery well 50 (FIG. 3) in a bore 52 and a monitoring well MW, located within a radius of 10 feet of the combination well 50. Each combination well 50 included two concentric tubes 54,58 with respective pneumatic pumps: a fluid recovery pump 62 and a groundwater pump 64. Uncontaminated sand 130 was packed between the peripheral surface of the bore 52 and the outside of the tubes 54,58. The sand 130 was capped with clay 134 and then concrete 138 and capped with a cover 142. The tubes 54,58 defined an annular space 60 therebetween. The tubes 54,58 were disposed in a well bore 52 and hydraulically isolated from one another by sealing means 68 to prevent mixing of fluid and water carried in the respective tubes. Each tube 54,58 had, respectively, one distal end 70,72 in the subsurface and open to the surrounding soil through perforated or slotted section 74 of tube 54 and 76 of tube 58. The perforated sections each preferably consisted of parallel 0.01 inch diameter slots 80.

Fluid or water pumping at each recovery location was independently and automatically controlled to maintain preselected pumping conditions. The data acquired from the five recovery systems revealed trends essentially identical to the trends described above for the lab model in Example 1.

Figure 3:
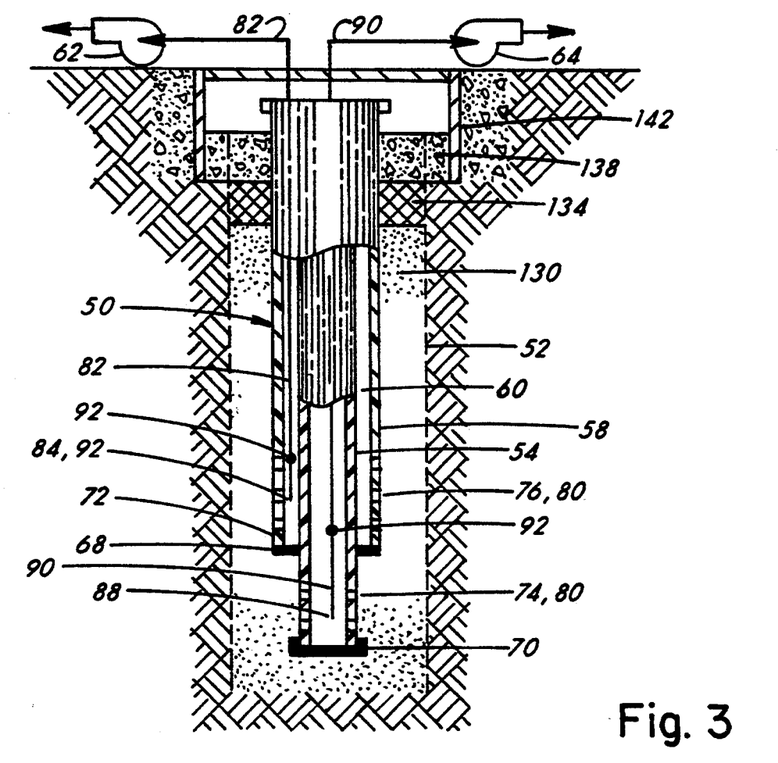
FIG. 3 is a schematic view, partially in section, of another embodiment of a recovery well of the invention, showing the arrangement of the well in the subsurface, as described in Example 1.

Typically, the outer tube 58 was opened to the subsurface medium from two feet above the position of the unstressed water table to four feet below the water table (through the free fluid region), while the inner tube 54 was opened to the next two feet of the groundwater zone below the outer tube 58. The pump 62 in the outer tube 58 recovered fluid through line 82 at inlet 84 from just below the air/fluid interface. Pump 64 in the inner tube pumped groundwater through inlet 88 from below the fluid/water interface and then through line 90. Pumping conditions were modified by sensors and controls 92 to maintain the fluid/water interface at its pre-pumping position and to maintain continuity of the fluid in the fluid zone of the medium with the fluid column in the recovery well 50. The on/off cycles of the pumps 62,64 were automatically controlled by presetting their refill and discharge times. In addition, the on/off cycle of the water pump 64 was controlled by a down-well bubbler control.

Level adjustment means sensed movement of the fluid/water interface and adjusted the suction end of one pump to a position below the fluid/water interface. A head or column of fluid was regulated by a sensor or transducer which floated on the fluid/water interface and was set to provide a head or height of fluid above the interface in the bore, to provide continuity of fluid in the bore with fluid in the surrounding soil of the fluid zone.

One or more additional level adjustment and control means automatically controlled the interval and/or rate of groundwater extraction to maintain the depressed fluid/water interface at about its prepumped position, and adjust the suction end of the water pump to a level below the fluid/water interface.

A two-inch ID monitoring well MW was installed within 10 feet of each recovery well 50 to provide information on the response of the fluid/water interface and on fluid thickness adjacent to the combination well 50 during pumping.

During the first two weeks of pumping at the field site, the system was frequently monitored and the pumping rates of fluid and water adjusted to establish the maximum fluid-pumping rate, to maintain a slug of fluid in the fluid recovery tube 58, and to maintain the fluid/water interface in the groundwater zone at its prepumped position. Subsequently, as understanding of the system response improved and that response became more predictable, the monitoring interval was increased to one week, then to two weeks, and then to one month, and finally to bimonthly.

The results showed that when the drawdown in the recovery well 50 was maintained at a depth of about 10 feet below the surface, corresponding to the depth of the fluid/water interface in the region of the centroid of the fluid contamination plume, the zone of influence of the recovery well was more than 100 feet after 10 days of pumping.

During a period of 770 days, a total of about 55,697 gallons (210,813 liters) of fluid were pumped from the five combination wells 50 at an average rate of about 8.7 gallons/hour (550 mL/min). The volume of fluid recovered from the five respective recovery wells 50 was 14,688; 15,017; 4,944; 14,787; and 6,259 gallons.

While the approach maintained a steady flow of fluid to the recovery well 50, it also restricted the fluid to the region of the soil and groundwater system that was already contaminated.

The good performance of the fluid recovery system was undoubtedly dependent on the new approach taken. By maintaining the water table drawdown at the initial position of the fluid/water interface, further spread of the fluid into the groundwater zone and reduction of the recoverable volume of fluid were minimized. In addition, by maintaining a slug or column of fluid in the recovery well 50 in contact with the fluid layer in the porous medium, the fluid flow to the well was maintained during pumping, and the residual volume of fluid remaining trapped in the porous subsurface medium was minimized.

EXAMPLE 2

Figure 4:
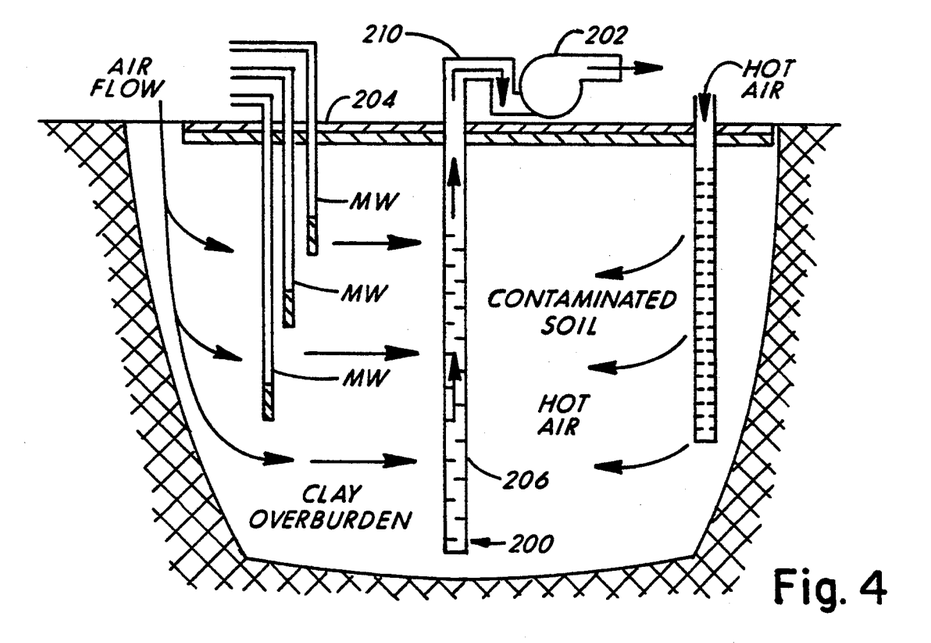
FIG. 4 is a diagram of still another embodiment of a recovery well and related system used as described in Example 2.

A vapor-extraction pilot system was installed in a contaminated clay area containing about 1780 kg of paint thinner. The test plot was instrumented to measure the effects of the vapor-extraction recovery well 200 and related system on the plot and its performance in removing the contaminant (FIG. 4). Pressure drawdown, vapor concentration, and extraction rate of paint thinner were intensively monitored for one year.

The amber colored paint thinner (density at 22° C.: 0.87 g mL$^{-1}$) collected from wells at the site was characterized by chromatographic, spectroscopic and physical methods. The total mass of paint thinner in the test area was estimated to be 1780±600 kg, equivalent to 540±180 gallons of liquid.

A diagram illustrating the pilot vapor-extraction system at the site is shown in FIG. 4. By this approach, one or more vapor-extraction recovery wells 200 are placed in the ground and are connected to a regenerative blower 202 which draws air through the contaminated soil by creating a partial vacuum in the well 200. A plastic barrier 204 on the ground surface enhances air flow laterally of the bore and through the soil and enhances formation of the zone of influence by preventing air flow from above-ground.

The fully instrumented test plot was designed to carry out long-term vapor-extraction pilot tests with necessary research capabilities including the ability: (1) to measure and control the air flow from each of the four extraction wells; (2) to accurately measure the removal rate of paint thinner vapor; and (3) to monitor changes in pressure and vapor concentration within the test plot.

Four two-inch diameter PVC vapor-extraction recovery wells 200 were installed in vertical borings through the clay overburden and were open to the soil through well perforated tube sections or screens 206 that were 5, 10 and 15 feet in length. The vapor-extraction recovery wells 200 were connected through a manifold system 210 constructed from two-inch ID PVC valves and pipes to a 1.5 HP regenerative blower 202 (E. G. & G. Rotton, Saugerties, N.Y.) and could be operated individually or in combination. The flow rate of the blower exhaust was measured at ambient pressure in a flowmeter utilizing the hot wire anemometer principle.

At 24 locations in the test area, 71 monitoring wells (MW, consisting of one-inch diameter PVC pipes with one-foot well screens at four-foot depth intervals) were installed to sample soil vapor and to measure the horizontal and vertical distribution of the pressure drawdown throughout the test plot.

The pilot-test plot was designed so that the zone of influence radiating from the centrally-located vapor-extraction recovery wells could be measured in any direction using the surrounding monitoring points. When pumping a single vapor-extraction recovery well 200 (designated VE-1) at a flow rate of 11 scfm, the irregularly-shaped zone of influence, defining the test plot, had dimensions of 50 ft×83 ft. The thin plastic barrier 204, spread over the soil surface and covered with a thin layer of gravel, extended over most of the pilot plot to enhance lateral air flow through the contaminated clay soil.

A vacuum pump with a pumping rate of about 10 L min$^{-1}$ was used to test soil permeability at several locations in the test plot using the vertical series of monitoring points (MW) with 1-ft well screens installed at 4-ft depth intervals at each location. Monitoring points in the contaminated and uncontaminated clay soil were pumped to determine the maximum vacuum (inversely proportional to the soil permeability) which could be produced at the pumped monitoring point, and the pressure drawdown created in the soil was measured at the nearest monitoring points above and below. The time required for the pressure drawdown at a monitoring point in the soil to reach steady state decreases with increasing soil permeability. These data were used to estimate the relative thickness of the fractured clay zone corresponding to a highly permeable porous layer and the less fractured, less permeable clay above the contaminated zone. Using this method, pumping tests were conducted at monitoring locations which were 5 to 20 feet west of the vapor-extraction recovery well 200 (VE-1). The results indicated that there was a zone of high permeability at these locations corresponding to the regions (12 to 20 feet deep) with the most paint thinner.

Using the central vapor-extraction recovery well, VE-1, a pilot test was conducted to optimize the air flow rate. The flow was adjusted to rates from 0 to 11.0 scfm, and flow rate, pressure in the well, and concentration of paint thinner vapor in the extraction air were measured. The rate of extraction of paint thinner (mg $min^{-1}$) was increased nearly linearly with increasing air flow rate until reaching about 7 scfm. The maximum vapor-extraction rate was reached at 10–11 scfm, which was then maintained during an eight-month pilot study of vapor extraction from well VE-1.

The paint thinner extraction rate, in milligrams per minute, was determined by multiplying the measured vapor concentration, in milligrams per liter, in the extraction air exhaust times the air flow rate, in liters per minute.

Figure 5:
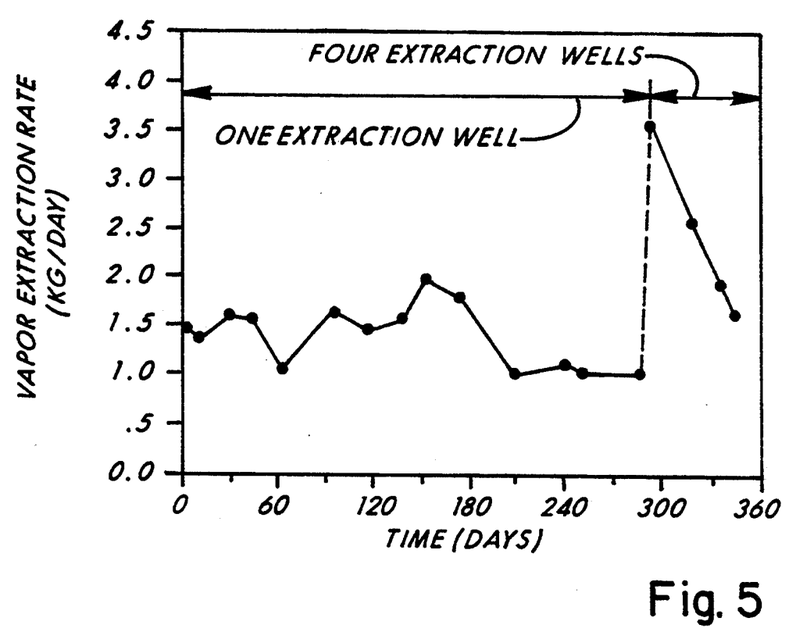
FIG. 5 is a diagram showing vapor-extraction rate over time as observed during a field test.

In FIG. 5, the extraction rate is plotted over time from the start of vapor-extraction tests. Despite a temporary increase when four wells were put in operation to obtain a higher flow rate, the extraction rate declined overall. This decline was caused mainly by changes in the paint thinner composition and volatility as predicted by Raoult's Law.

The mass of paint thinner removed (M) during each time period of the pilot test was determined by multiplying the mean rate of extraction (R in milligrams per minute) in a time interval from $t_1$ to $t_2$ times the length of the interval:

$$M = R_2 + R_1/2 \times (t_2 - t_1)$$

The cumulative mass of paint thinner removed was obtained by summing the masses from the individual time periods of FIG. 5. The total mass obtained during the eight-month pilot study using one well pumped at 11.0 scfm was 333 kg, which represented 19 percent of the estimated amount of paint thinner originally in the zone of influence. During the succeeding four months, when other vapor-extraction tests were conducted using four wells, a further 218 kg were removed. The total paint thinner extracted during one year was thus 550 kg or 31 percent of the initial mass of paint thinner in the test plot estimated by analysis of soil cores.

This estimate of percentage removal is similar to the reduction observed in the soil gas vapor concentrations at several sampling points and is consistent with the change in composition observed in vapor samples taken from sampling points in the clay and the vapor-extraction system.

The removal of 31 percent of the initial paint thinner in one year demonstrated that the vapor-extraction method could clean up the entire test plot in four to five years.

The design of a clean-up system and placement of recovery wells for vapor extraction in other areas was based on the optimum radius of influence from individual extraction wells, which was determined to be about 20 feet in the test area. A scaled-up vapor-extraction system optimized to sweep each part of the site effectively required recovery wells to be installed about 40 feet apart, preferably with surface barriers to control the direction of air flow. It was found that adding too many wells in an attempt to further accelerate the extraction process would be counterproductive. The four wells were able to extract 39.8 scfm, operated in combination, while the total of the four air flows from the extraction wells, operated individually, was 48.1 scfm.

EXAMPLE 3

The product recovery pumping strategy of Example 1 was combined with the vapor extraction recovery method of Example 2 at a field site to achieve optimum recovery of all components of a spilled fluid. The test site included a combination product-recovery and vapor-extraction well as shown in FIG. 2. In this case, the perforated pipe 16 was exposed to air moving through the soil, the free product layer and the groundwater. The vacuum tended to cause the groundwater to move up (form a mound) around the well bore. Free product also tended to form a mound. Simultaneous pumping of fluid and water countered the mounding effect, thus preventing interference with removal of all components of fluid through the bore. The vacuum enhanced movement of liquid components of fluid toward the bore. Thus, the synergistic effect of the combined method (i.e. Example 1 plus Example 2) was observed.

Figure 6:
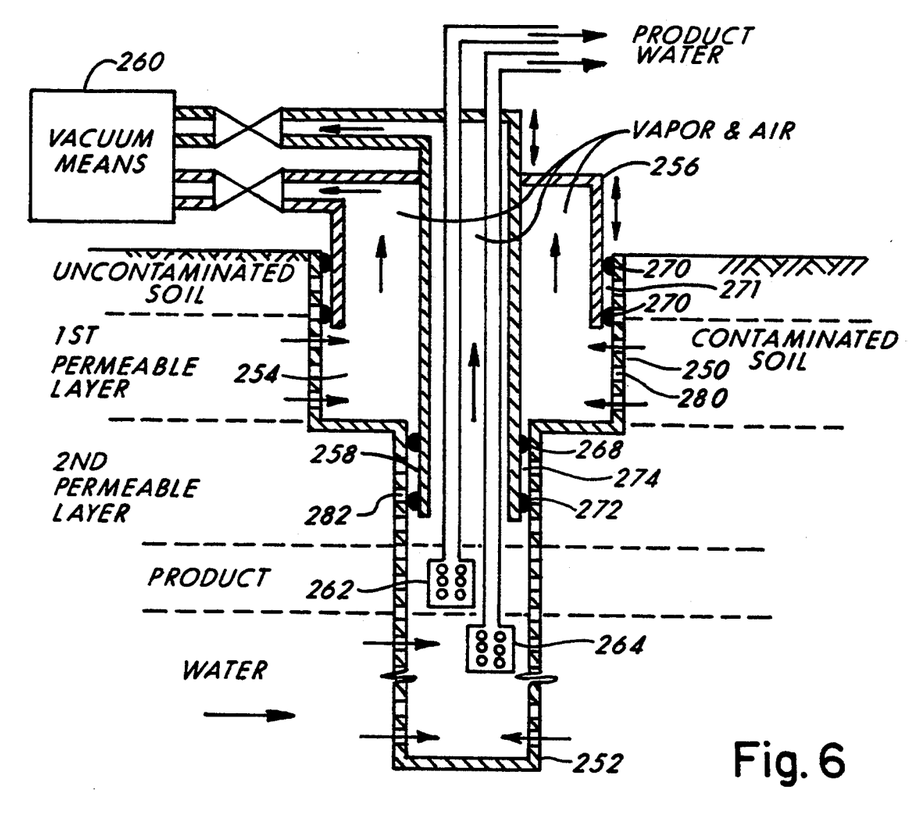
FIG. 6 is a schematic view, partially in section, of still another embodiment of a recovery well of the invention suitable to recover all of the components of an immersible fluid contaminant from more than one layer of subsurface.

If it is desired to remove contaminant by applying a vacuum to two or more selected portions of the subsurface, the well of FIG. 2 may be modified as shown in FIG. 6. FIG. 6 shows a perforated first chamber in the form of a first tube 250 with a distal end disposed in the bore and a perforated second chamber in the form of a second tube 252, with a diameter (peripheral extent) less than that of the first tube. The first tube has a top end at or adjacent the surface of the earth and a distal end in the subsurface. The second tube 252 preferably extends from the top surface of the earth to below the first tube. Alternatively, the second tube 252 has a distal end in the subsurface and a top end adjacent the distal end of the first tube 250 or inside the first tube 250. A third tube 256 moves axially of first tube 250 (first chamber) in annulus 254. A fourth tube 258 moves axially within second tube 252 (second chamber).

Vacuum means 260 applies vacuum as described in connection with FIG. 2. Pumps, respectively, pump fluid and water. Preferably, seals 268 are disposed adjacent the lower end of the first tube 250 and between the first and second tubes 250, 252. Seals 270 are disposed between the first 250 and third 256 tubes adjacent the lower end of the third tube 256 and arranged to seal an annulus 271 formed by the first and third tubes 250, 256. Seals 272 are disposed between the second 252 and fourth 258 tubes adjacent the lower end of the fourth tube 258 and arranged to seal an annulus 274 formed by the second and fourth tubes 252, 258. Preferably, perforations 280 in the first tube 250 are arranged between the first seal 268 and the upper end of the first tube 250, and perforations 282 in the second tube are arranged between the seal 268 and the lower end of the second tube 252.

While this invention has been described in terms of certain embodiments thereof, it is not intended that it be limited to the above description, but rather only to the extent set forth in the following claims.

The embodiments of the invention in which an exclusive property or privilege is claimed are defined as follows:

1. A method for extracting a spilled fluid from a subsurface of earth, the fluid having a component volatilizable to a vapor and a relatively less volatile liquid component, the fluid being immiscible with and lighter than water and occupying a fluid zone overlying groundwater, thus producing air/fluid and fluid/water interfaces, the underlying water occupying a groundwater zone displaced downward by the fluid relative to an unstressed water table, comprising:
   a) penetrating through the fluid zone and at least partially through the groundwater zone to provide a bore in communication with the fluid and groundwater zones;
   b) extracting an amount of liquid component of the fluid from the fluid zone through the bore, the amount selected to maintain contact between at least a portion of the liquid being extracted through the bore and at least a portion of the liquid remaining in the fluid zone;
   c) separately extracting an amount of water from the groundwater zone through the bore to prevent movement of water upward into the fluid zone and to provide a head of liquid above the fluid/water interface adjacent the bore sufficient to cause gravity drainage of the liquid from the fluid zone in a direction generally toward the bore while maintaining a major portion of the fluid/water interface and any unstressed portions of the water table at levels closely adjacent the levels occupied prior to commencing any extraction of the liquid and the water, to prevent further spread of the liquid; and
   d) applying a vacuum through the bore and then to one or more selected portions of the subsurface lateral of the bore to volatilize the volatilizable component to a vapor and to induce movement of the vapor and liquid components of the fluid into the bore for extraction through the bore.

2. The method according to claim 1 and further comprising depressing the level of the groundwater zone adjacent the bore to cause any fluid intermingled with the groundwater to be separated from the groundwater, and applying a vacuum to the groundwater zone to volatilize the volatilizable components to a vapor and to induce movement of the vapor and liquid components of the fluid into the bore for extraction through the bore.

3. The method according to claim 2 wherein the step of depressing the level of the groundwater zone and the step of applying the vacuum to the groundwater zone are each conducted after steps (a) through (d) of claim 1.

4. The method according to claim 3 and further comprising monitoring the rate of extraction of the fluid to determine whether the rate has declined and, when the rate declines, commencing the step of depressing the level of the groundwater zone and the step of applying the vacuum to the groundwater zone while continuing step (a) through (d) of claim 1.

5. The method according to claim 2 wherein one of the selected portions of the subsurface includes the groundwater zone.

6. The method according to claim 1 wherein the applied vacuum is sufficient to draw air in an amount sufficient to remove the vapor from the subsurface substantially immediately upon its formation, thereby preventing recondensation of the vapor.

7. A method for extracting a spilled fluid from a subsurface of earth, the fluid having a component volatilizable to a vapor and a relatively less volatile liquid component, the fluid being immiscible with and lighter than water and occupying a fluid zone overlying groundwater, thus producing air/fluid and fluid/water interfaces, the underlying water occupying a groundwater zone displaced downward by the fluid relative to an unstressed water table, comprising:
   a) penetrating through the fluid zone and at least partially through the groundwater zone to provide a bore in communication with the fluid and groundwater zones;
   b) extracting an amount of liquid component of the fluid from the fluid zone through the bore, the amount selected to maintain contact between at least a portion of the liquid being extracted through the bore and at least a portion of the liquid remaining in the fluid zone;
   c) separately extracting an amount of water from the groundwater zone through the bore to prevent movement of water upward into the fluid zone and to provide a head of liquid above the fluid/water interface adjacent the bore sufficient to cause gravity drainage of the liquid from the fluid zone in a direction generally toward the bore while maintaining a major portion of the fluid/water interface and any unstressed portions of the water table at levels closely adjacent the levels occupied prior to commencing any extraction of the liquid and the water, to prevent further spread of the liquid; and
   d) applying a vacuum through the bore and then to one or more selected portions of the subsurface lateral of the bore
while at the same time injecting heated air into the subsurface through a second bore external of the first bore whereby the applied vacuum and the injected air cooperate to volatilize the volatilizable component to a vapor, and to induce movement of the vapor and the liquid into the bore for extraction.

8. The method according to claim 1, further including:
   penetrating through the fluid zone and at least partially through the groundwater zone adjacent the bore to thereby provide a monitoring well; and
   detecting the level of at least one of the fluid, the water and the fluid/water interface in the monitoring well and then selecting the intervals and the amounts based upon the detected level.

9. The method according to claim 2 wherein each applied vacuum is sufficient to draw air in an amount sufficient to remove the vapor from the subsurface substantially immediately upon its formation, thereby preventing recondensation of the vapor.

10. A method for extracting a spilled fluid from a subsurface of earth, the fluid having a component volatilizable to a vapor and a relatively less volatile liquid component, the fluid being immiscible with and lighter than water and occupying a fluid zone overlying groundwater, thus producing air/fluid and fluid/water interfaces, the underlying water occupying a groundwater zone displaced downward by the fluid relative to an unstressed water table, comprising:

a) penetrating through the fluid zone and at least partially through the groundwater zone to provide a bore in communication with the fluid and groundwater zones;

b) extracting an amount of liquid component of the fluid from the fluid zone through the bore, the amount selected to maintain contact between at least a portion of the liquid being extracted through the bore and at least a portion of the liquid remaining in the fluid zone;

c) separately extracting an amount of water from the groundwater zone through the bore to prevent movement of water upward into the fluid zone and to provide a head of liquid above the fluid/water interface adjacent the bore sufficient to cause gravity drainage of the liquid from the fluid zone in a direction generally toward the bore while maintaining a major portion of the fluid/water interface and any unstressed portions of the water table at levels closely adjacent the levels occupied prior to commencing any extraction of the liquid and the water, to prevent further spread of the liquid;

d) applying a vacuum through the bore and then to one or more selected portions of the subsurface lateral of the bore to volatilize the volatilizable component to a vapor, and to induce movement of the vapor and liquid components of the fluid into the bore for extraction through the bore;

e) depressing the level of the ground water zone adjacent the bore to cause any fluid intermingled with the groundwater to be separated from the groundwater; and f) applying a vacuum to the groundwater zone in a manner as described in step (d);

one or both of the steps of applying a vacuum being conducted while at the same time injecting heated air into the subsurface through a second bore external of the first bore whereby the applied vacuum and the injected air cooperate to volatilize the light component to a vapor and to induce movement of the vapor and the liquid into the bore for extraction.

11. An apparatus for use in removing a spilled fluid from a subsurface of earth through a well bore having an upper end exposed to a top surface of the earth and a distal lower end disposed in the subsurface, the fluid having a component volatilizable to a vapor and relatively less volatile liquid component, comprising:

means defining a perforated chamber disposed in the bore and a tube encompassed by the chamber means, the tube and chamber means each having respective upper ends adjacent the top surface and distal lower ends disposed in the bore, the tube extending axially within with the chamber means and having an opening, an annulus defined by the chamber means and the tube, and a seal disposed between the chamber means and the tube;

vacuum means sealingly connected to the tube to apply a vacuum through the opening in the tube to evacuate a portion of the chamber means; and the tube being movable axially of the chamber means to expose a varying portion of the perforated axial extent of the chamber means to the vacuum, whereby the vacuum is applied to a selected portion of the subsurface directing movement of air therethrough to volatilize the volatilizable component to a vapor and to induce movement of the vapor and the liquid components to and through the chamber means and the tube and to the top surface.

12. The apparatus according to claim 11 having the seal disposed adjacent the lower end of the tube.

13. The apparatus according to claim 11 and further comprising a barrier disposed over the top surface of the earth adjacent the well bore and arranged to enhance air flow laterally of the bore through the soil and toward the bore.

14. The apparatus according to claim 11 having the vacuum means sealingly connected to the upper ends of the tube and the opening at the lower end of the tube.

15. An apparatus for use in removing a spilled fluid from a subsurface of earth through a well bore having an upper end exposed to a top surface of the earth and a distal lower end disposed in the subsurface, the fluid having a component volatilizable to a vapor and relatively less volatile liquid component, comprising:

means defining a perforated first chamber disposed in the bore and means defining a perforated second chamber with a peripheral extent less than that of the first chamber means, each chamber means having respective upper ends adjacent the top surface and distal lower ends disposed in the bore, and the chamber means sealed from one another;

a first tube having an upper end, a lower end disposed in the first chamber means and an opening;

a second tube having an upper end, a lower end disposed in the second chamber means and an opening;

a first seal between the first chamber means and the first tube and a second seal between the second chamber means an the second tube;

vacuum means sealingly connected to the first and second tubes to apply a vacuum through each respective one of the openings of the tubes to evacuate a portion of each respective one of the chamber means; and the first and second tubes each being movable axially of, respectively, the first and second chamber means to expose a varying portion of the perforated axial extent of each of the first and second chamber means to the vacuum, whereby the vacuum is applied to one or more selected portions of the subsurface directing movement of air therethrough to volatilize the volatilizable component to a vapor and to induce movement of the vapor and the liquid components to and through the tubes and to the top surface.

16. The apparatus according to claim 15 having a third seal disposed adjacent the lower end of the first chamber means.

17. The apparatus according to claim 16, wherein the perforations in the first chamber means are arranged between the third seal and the upper end of the first chamber means.

18. The apparatus according to claim 16, wherein the perforations in the second chamber means are arranged between the third seal and the lower end of the second tube.

19. The apparatus according to claim 15 and further comprising a barrier disposed over the top surface of the earth adjacent the well bore and arranged to enhance air flow laterally of the bore through the soil and toward the bore.

20. The apparatus according to claim 15 having the vacuum means sealingly connected to the upper ends of, respectively, the first and second tubes.

21. The apparatus according to claim 15 having a respective one of the openings at the lower end of a corresponding one of the tubes.

* * * * *